(12) United States Patent
Miller et al.

(10) Patent No.: US 7,012,402 B2
(45) Date of Patent: Mar. 14, 2006

(54) BATTERY CHARGING CONTROL (75) Inventors: Gary Miller, Gainesville, FL (US); John Atkins, Gainesville, FL (US)

(73) Assignee: Sabine, Inc., Gainesville, FL (US)

( * ) Notice: Subject to any disclaimer, the term of this patent is extended or adjusted under 35 U.S.C. 154(b) by 374 days.

(21) Appl. No.: 10/061,334

(22) Filed: Feb. 4, 2002

(65) Prior Publication Data

US 2003/0146733 A1    Aug. 7, 2003

(51) Int. Cl.
H02J 7/00    (2006.01)

(52) U.S. Cl. ....................... 320/106; 320/110
(58) Field of Classification Search ............... 320/106, 320/110, 112, 137, 114, 115, 132, 136, 11; 381/91, 111, 112, 113, 115, 116; 434/307 A, 434/309
See application file for complete search history.

(56) References Cited

U.S. PATENT DOCUMENTS

| 4,577,144 A | 3/1986 | Hodgman et al. ............. 320/2 |
| 5,438,248 A | 8/1995 | Hyuck ......................... 320/15 |
| 5,485,090 A | 1/1996 | Stephens ..................... 324/439 |
| 5,489,835 A | 2/1996 | Stephens et al. ............ 320/106 |
| 5,600,224 A * | 2/1997 | Mody et al. ................. 320/106 |
| 5,678,207 A * | 10/1997 | Williams et al. ......... 455/569.2 |
| 5,998,962 A | 12/1999 | Akiya ......................... 320/106 |
| 5,999,801 A * | 12/1999 | Johnson ....................... 455/92 |
| 6,043,625 A | 3/2000 | Dowe ......................... 320/106 |
| 6,067,474 A * | 5/2000 | Schulman et al. ............ 607/57 |
| 6,191,551 B1 | 2/2001 | Fischer et al. ............. 320/106 |
| 6,215,275 B1 | 4/2001 | Bean ........................... 320/106 |
| 6,366,054 B1 * | 4/2002 | Hoening et al. ............ 320/132 |
| 6,400,123 B1 * | 6/2002 | Bean et al. ................. 320/132 |
| 6,560,469 B1 * | 5/2003 | Kim et al. ................... 455/569 |
| 2001/0000423 A1 | 4/2001 | Fisher et al. ................ 320/114 |
| 2001/0021092 A1 | 9/2001 | Astala ......................... 361/90 |
| 2001/0028238 A1 | 10/2001 | Nakamura et al. .......... 320/132 |

* cited by examiner

Primary Examiner—Donald Sparks
Assistant Examiner—Lawrence Luk
(74) Attorney, Agent, or Firm—Donald W. Marks (57) ABSTRACT A wireless microphone is provided with a recharging circuit which determines if a battery in the microphone is a rechargeable type and can be safely recharged. The recharging circuitry in the microphone, which could also be included in other handheld wireless devices, determines if a battery is in a charged state where it is difficult to distinguish rechargeable and non-rechargeable batteries. If so the battery is discharged until the battery reaches a charged state where non-rechargeable batteries can be readily distinguished from rechargeable batteries.

20 Claims, 5 Drawing Sheets

BATTERY CHARGING CONTROL

BACKGROUND

The present invention relates to battery recharging circuits for recharging standard size rechargeable batteries used in wireless devices and also relates to microphones using rechargeable batteries.

The prior art contains several recharging circuits for recharging batteries in wireless devices such as cell phones, portable phones, personal data assistants, wireless microphones, etc. Many of these devices utilize standard batteries sizes such as size AAA, AA, C, D or 9-volt batteries. Both rechargeable battery types such as nickel-cadmium and nickel-metal-hydride (NiMH) type batteries and non-rechargeable battery types such as manganese-dioxide and alkaline (Alk) type batteries are available in standard battery sizes. Users are warned not to recharge the non-rechargeable battery types because attempting to recharge such non-rechargable batteries can result in leakage, overheating and/or explosion. Many of the prior art recharging circuits perform electrical tests on the batteries being recharged to determine if the batteries are a rechargeable type and if not prevent charging of non-rechargeable batteries.

In certain ranges of charged states, non-rechargeable batteries can be readily distinguished from rechargeable batteries, but in other ranges of charged states, the non-rechargable batteries cannot be distinguished readily from rechargeable batteries by the prior art recharging circuits. When a battery is in a charged state where it is difficult to distinguish rechargeable batteries from non-rechargeable batteries, the prior art generally applies a charging voltage for a short period of time and then retests the battery to determine if the battery is a rechargeable battery. The prior art testing for rechargeable batteries has deficiencies as well as running the risk of battery leakage, overheating and explosion.

In prior art wireless microphones which use standard sizes of rechargeable batteries, the batteries must be removed and placed in a separate battery charger. Battery removal and replacement runs the risk of causing damage to the microphone.

SUMMARY OF THE INVENTION

In one aspect of the present invention a microphone is provided with a recharging circuit which determines if a battery in the microphone is a rechargeable type and can be safely recharged.

In a second aspect of the present invention a battery recharging circuit distinguishes whether a battery in the difficult to distinguish charged state is rechargeable or non-rechargeable by discharging the battery until the battery reaches a charged state where non-rechargeable batteries can be readily distinguished from rechargeable batteries.

For distinguishing conventional rechargeable nickel-cadmium or nickel-metal-hydride batteries from non-rechargeable alkaline or manganese-dioxide batteries, a charged state producing an open circuit voltage greater than about 1.4 volts indicates a non-rechargeable battery since only non-rechargeable batteries produce voltages greater than about 1.4 volts. In a range of open circuit voltages from about 1.12 volts to about 1.4 volts, the internal resistance of a rechargeable battery is generally less than about 0.01 ohms while the internal resistance of a non-rechargable battery is greater than about 0.1 ohms so that measurements indicative of internal resistance can distinguish a rechargeable battery from a non-rechargeable battery. When the open circuit voltage is in a range from about 1.02 volts to about 1.12 volts, the internal resistance of a non-rechargeable battery cannot reliably be distinguished from the internal resistance of a chargeable battery. A battery in this indistinguishable range is discharged until its open circuit voltage is below about 1.02 volts. At open circuit voltages below 1.02 volts the internal resistance of a rechargeable battery increases to 40 ohms or higher while the internal resistance of a non-rechargeable battery only increases to a maximum generally less than 10 ohms so that measurements indicative of battery internal resistance can be used to distinguish a rechargeable battery from a non-rechargeable battery.

It has been discovered that rechargeable batteries in a discharged state producing open circuit voltages in the range from 1.02 to 1.12 volts can be ready discharged to a state of open circuit voltage less than about 1.02. This discovery allows rechargeable batteries to be distinguished from non-rechargeable batteries without running the risk of overheating, leakage or explosion during recharging.

DETAILED DESCRIPTION OF THE INVENTION

Figures 1, 2:
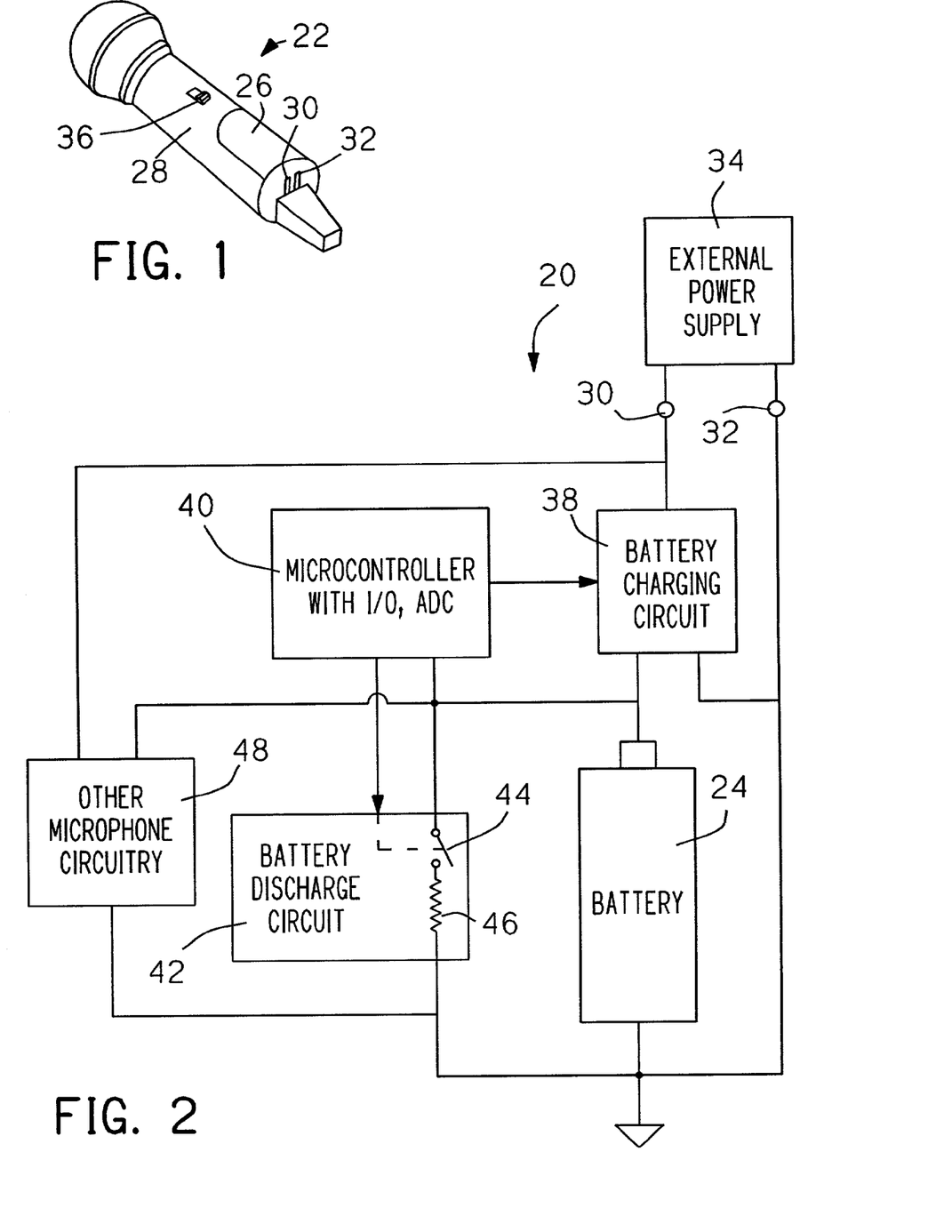
FIG. 1 is a perspective view of a wireless microphone in accordance with one embodiment of the invention.
FIG. 2 is a block diagram of electronic circuitry in the microphone of FIG. 1.

One embodiment of the invention is a circuit, illustrated generally at 20 in FIG. 2, included in a wireless microphone, indicated generally at 22 in FIG. 1. The microphone 22 utilizes a standard size battery 24 which can be removed and replaced through a removable door 26 in a handle portion 28 of a casing of the microphone. Electrical terminals 30 and 32 are provided on the casing for connecting the microphone to an external power supply 34. When connected to the external power supply 34, the microphone circuitry is energized by the voltage from the power supply, and when the microphone is not connected to the external power supply 34, the microphone circuitry is energized by the voltage from the battery 24. A switch 36 is provided on the microphone 22 for turning off and on portions of the circuitry.

U.S. patent application Ser. No. 10/061,317 titled Holder for Recharging a Wireless Microphone by Doran Oster and Gary Miller filed herewith, now U.S. Pat. No. 6,548,987 issued Apr. 15, 2003, describes a suitable microphone holder with terminals for connecting the external power supply to the microphone.

The circuitry 20 includes a battery charging circuit 38 controlled by a microprocessor or microcontroller 40 which determines if the battery 24 is a rechargeable type of battery before enabling the recharging of the battery. To determine whether the battery 24 is rechargeable or non-rechargeable, the microcontroller 40 performs voltage measurements and load switching across the battery and processes those voltage measurements to obtain an indication of the internal resistance of the battery. The internal resistances of rechargeable and non-rechargeable batteries change dynamically with changes in the charged states of the batteries. Within certain ranges of charged states the internal resistances of rechargeable and non-rechargeable batteries differ sufficiently to reliably indicate whether the present battery is rechargeable or non-rechargeable, but in one range of changed states the differences in internal resistances between rechargeable and non-rechargeable batteries is insufficient to reliably indicate whether the battery is rechargeable or non-rechargeable. The microcontroller 40 also controls a battery discharge circuit 42 such as a switch 44 which can be closed to connect a resistance 46 across the battery 24. The battery discharge circuit 42 is used to load the battery 24 during voltage measurements and to discharge the battery 24 to a lower charged state when the charged state of the battery is in a range where internal resistance does not reliably indicate whether the battery is rechargeable or non-rechargeable.

Other microphone circuitry 48 in the microphone includes conventional wireless microphone circuitry such as a transducer (not shown) for converting sound to electrical signals, an amplifier (not shown) and a transmitter (not shown) for transmitting the microphone output to a remote receiver (not shown).

Figure 3:
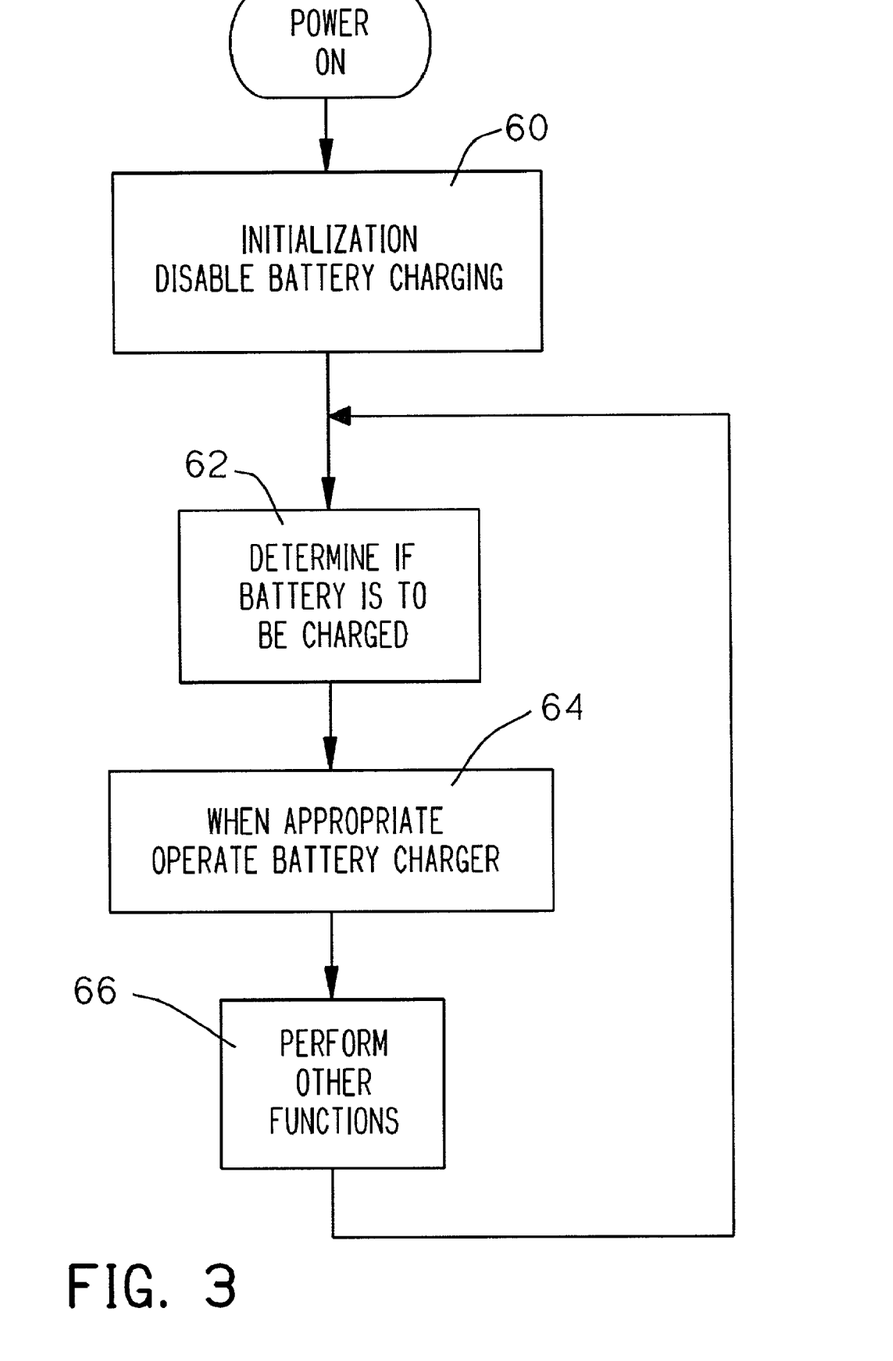
FIG. 3 is a flow diagram of software controlling a microcontroller in the circuitry of FIG. 2.

Operation of the microcontroller 40 is controlled by a program shown in FIG. 3. This program is stored in ROM which is either internal or external to the microcontroller. Additionally the microcontroller 40 includes internal or external RAM for temporarily storing data and performing functions. When power is initially applied to the microcontroller 40, step 60 performs initialization procedures including resetting or clearing all flags along with other conventional startup procedures as well as disabling the battery charging circuit 38. In step 62, the program calls a procedure to determine if a battery is to be charged. If found appropriate in step 62, step 64 enables the battery charging circuit 38 to perform conventional battery charging functions. In step 66 the program performs any other functions to be performed by the microphone. It is noted that the program continuously cycles through steps 62, 64 and 66, for example, at least about ten or more times per second.

Figure 4:
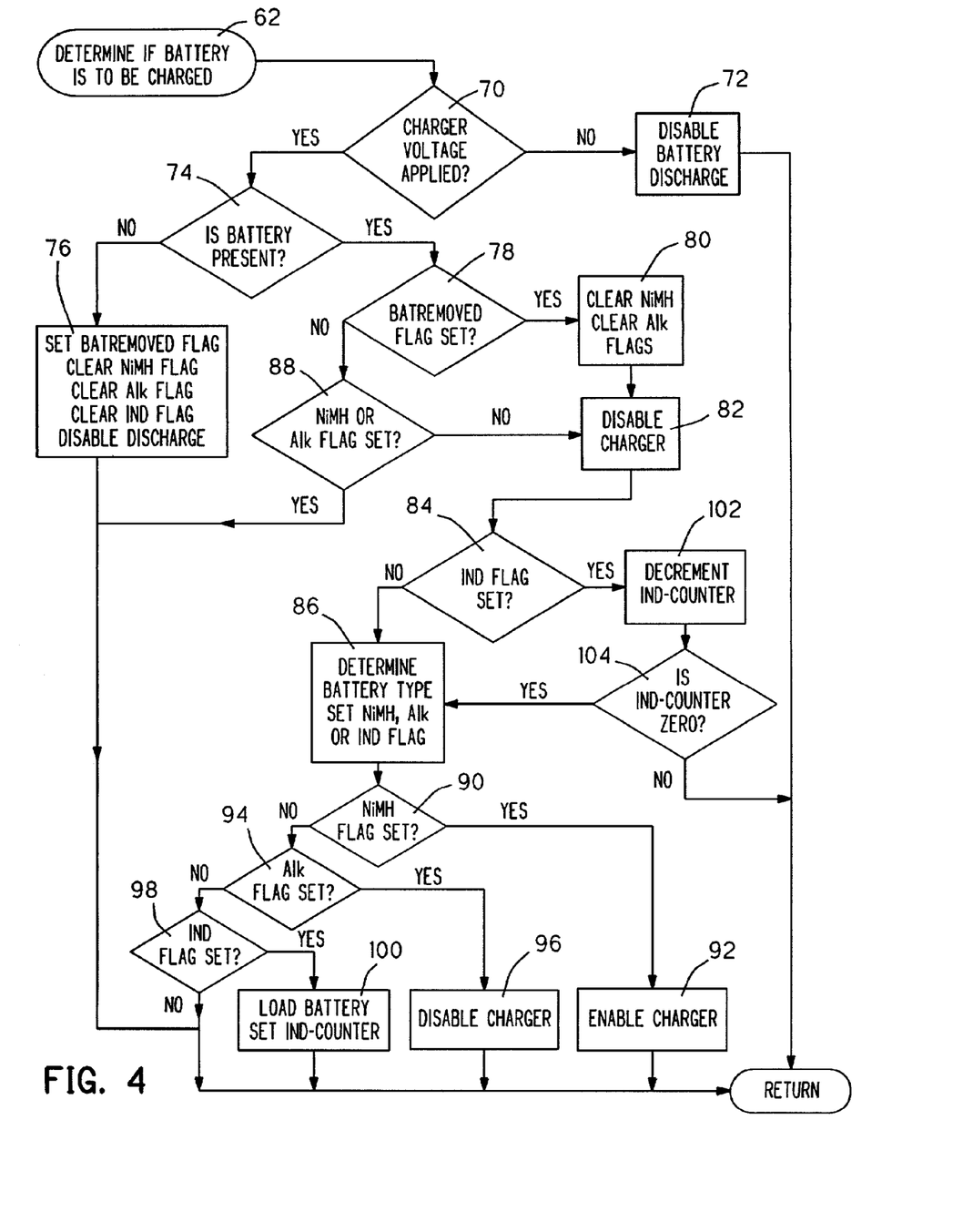
FIG. 4 is flow diagram of a procedure in the software of FIG. 3 to determine if a battery is to be recharged.

The procedure 62 to determine if the battery is to be charged is shown in FIG. 4 wherein it is initially determined in step 70 whether the microphone 22 is energized by the external power supply 34. If the microphone is not connected to the power supply or the power supply is not functioning, no battery charging can be performed. Thus the procedure branches to step 72 where any battery discharge by the discharge circuit 42 is stopped following which the program returns to the main procedure of FIG. 3. However, if the microphone is energized by the external power supply, step 74 determines if a battery is present. Again if there is no battery present, no charging can occur and the procedure in step 76 sets a battery removed flag (BATREMOVED), clears a NiMH (rechargeable battery present) flag, clears an Alk (non-rechargable battery present) flag, clears an indeterminate (IND) flag and disables the battery discharge circuit 42 before returning to the main program. It is noted that NiMH is a type of rechargeable battery which is widely used and that Alk (Alkaline) is a type of non-rechargeable battery which is widely used; the NiMH and Alk flags are named after these popular types of batteries but other types of rechargeable batteries and other types of non-rechargeable batteries have electrical characteristics similar to the respective NiMH and alkaline batteries and can be detected by the present procedure. The IND (indeterminate) flag is treated by the program as a type of battery but indicates that the present battery is in a charged state where the internal resistance of the battery cannot be used reliably to indicate whether a rechargeable or non-rechargeable battery is present.

If the microphone is found energized by the external power supply and the battery is present, step 78 determines if the battery removed flag is present. This flag is set if the battery is found missing in step 76 or during battery type determination or by the initialization procedure 60 of FIG. 3. When the battery removed flag is set the procedure advances to step 80 where any set NiMH or Alk flag is cleared and then to step 82 where any battery discharging by the battery discharge circuit 42 is discontinued. Next, step 84 determines if the IND flag is set. The IND flag is cleared during initialization 60, if a battery is not present in step 76 and upon start of a battery type determination procedure. When step 84 is false, the procedure branches to step 86 where a determine battery type procedure is called. This determine battery type procedure 86 continues to be called each time the program cycles through the procedure 86 until the procedure determines a battery type, NiMH, Alk or IND. The determine battery type procedure also resets the battery removed flag (BATREMOVED) when a battery is present so that after the first pass through step 86, step 78 is false to branch to step 88 which branches to step 82 until a battery type NiMH or Alk is determined. After returning from the determine battery type procedure, step 90 determines if the NiMH flag is set and if true proceeds to step 92 where the battery charger circuit 38 is enabled. If the procedure of step 86 sets the Alk flag, step 94 branches to step 96 where the battery charging circuit 38 is disabled. When the result of step 86 is a set IND flag, step 98 advances to step 100 where the battery discharge circuit 42 is operated to load the battery and begin discharging the battery. Step 100 also sets a discharge time timer (IND-counter) which is set for a period of time selected to discharge the battery to a lower charged state.

When the IND flag is found set in step 84, the procedure branches to step 102 where the IND counter is decremented and then to step 104 where it is determined if the IND counter is zero. After the IND-counter is decremented to zero, the procedure branches from step 104 to step 86 to again determine the battery type. It is noted that if the procedure of step 86 again sets the IND flag, the program again cycles through steps 100, 102 and 104 to continue the discharge of the battery. Thus the period of time set in step 100 need only insure a partial change in the battery charge toward the lower charged state where internal battery resistance is a reliable indicator distinguishing rechargeable batteries from non-rechargeable batteries.

From step 72, 76, 88 if true, 92, 96, 98 if false, 100 or 104 if false, the program returns to step 64 in FIG. 3. While the microphone is disconnected from the external power supply 34, the procedure 62 continuously cycles through steps 70 and 72. When the battery is removed while connected to the external power supply, the procedure 62 continuously cycles through steps 70, 74 and 76. After a battery is replaced or initially installed and the microphone is connected to the external power supply, the procedure 62 on the first pass cycles through steps 70, 74, 78, 80, 82, 84, 86, 90, 94 and 98 and on subsequent passes cycles through steps 70, 74 78, 88, 82, 84, 86, 90, 94 and 98 until a battery type is determined. On the cycle that step 86 determines a battery type NiMH, Alk or IND, the step 90, 94 or 98 branches to the corresponding step 92, 96 or 100. On subsequent cycles after a battery type of NiMH or Alk has been determined and while the microphone remains connected to the external power supply, the determine if battery is to be charged procedure continuously cycles through steps 70, 74, 78 and 88. If the battery type set in step 86 is IND then subsequent cycles through the procedure 62 pass through steps 70, 74, 78, 88, 82, 84, 102 and 104 until the IND counter is decremented to zero whereupon step 104 branches to step 86 and cycling passes through steps 70, 74, 78, 88, 82, 84, 86, 90, 94 and 98 until a battery type is again determined.

Figure 5:
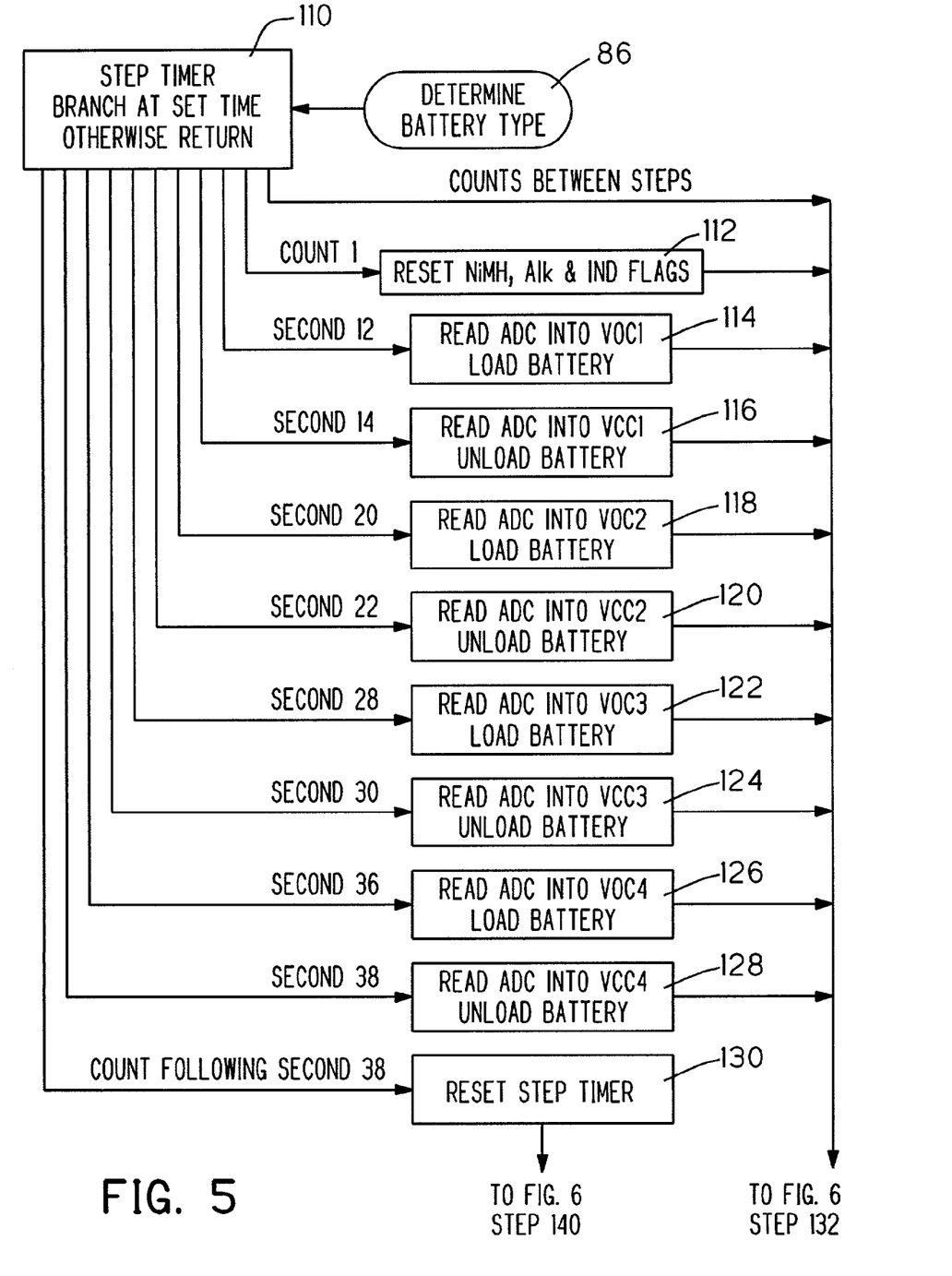
FIG. 5 is a flow diagram of a first portion of a procedure to determine a battery type in the procedure of FIG. 4.
Figure 6:
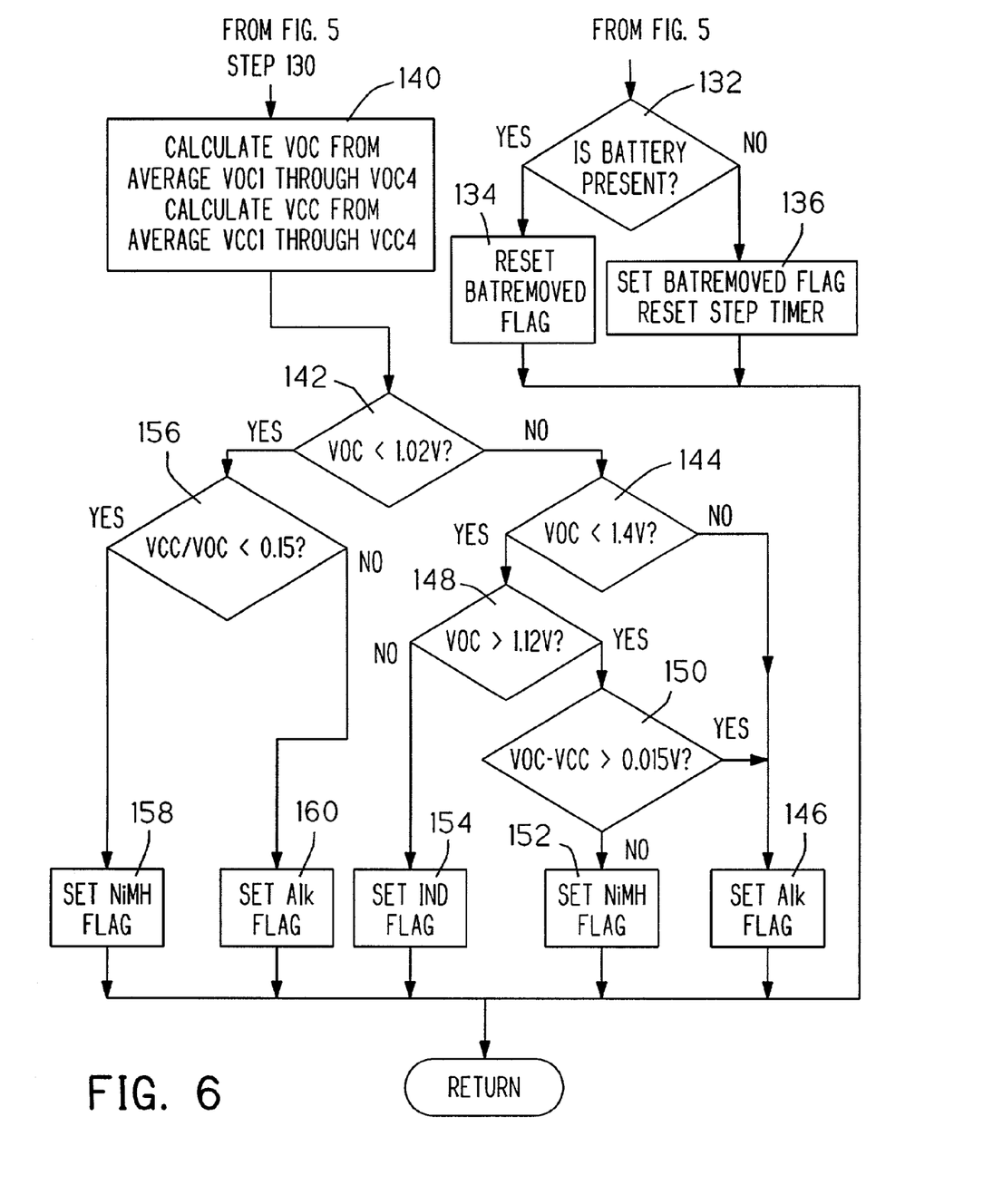
FIG. 6 is a flow diagram of a second portion of the procedure of FIG. 5 to determine the battery type.

The determine battery type procedure 86 is shown in FIGS. 5 and 6 wherein step 110 steps a step timer and then branches to one of steps 112, 114, 116, 118, 120, 122, 124, 126, 128, 130 or 132 based upon the count in the step timer. At count 1, step 112 resets the NiMH, Alk and IND flags and proceeds to step 132 where it is determined if a battery is present. If step 132 is true, battery removed flag is cleared in step 134, and if false, the battery removed flag is set and the step timer is reset in step 136. At the count corresponding to about second 12, step 114 reads the voltage ADC (the output of an internal or external analog to digital converter in the microcontroller 40) across the battery 24 into RAM memory at VOC1 and operates the battery discharge circuit 42 to load the battery; at about second 14, step 116 reads ADC into RAM at VCC1 and disables the battery discharge circuit to unload the battery; at about second 20, step 118 reads ADC into RAM at VOC2 and loads the battery; at about second 22 step 120 reads ADC into VCC2 and unloads the battery; at about second 28, step 122 reads ADC into RAM at VOC3 and loads the battery; at about second 30 step 124 reads ADC into VCC3 and loads the battery; at about second 36, step 126 reads ADC into RAM at VOC4 and loads the battery; and at about second 38 step 128 reads ADC into VCC4 and unloads the battery. At the step timer count following the count calling step 128, step 130 is called where the step timer is reset to be ready for another determine battery type procedure 86. At all other counts (other than those calling one of the steps 112, 114, 116, 118, 120, 122, 124, 126, 128 and 130), the determine battery type procedure advances directly to the step 132. Also the procedure goes to step 132 from any of the steps 112, 114, 116, 118, 120, 122, 124, 126 and 128.

From step 130, the determine battery type procedure advances to step 140 where the average of VOC1, VOC2, VOC3 and VOC4 is calculated and stored into VOC. Also the step 130 calculates the average of VCC1, VCC2, VCC3 and VCC4 and stores the result into VCC. Step 142 determines if the unloaded or open circuit voltage VOC across the battery is less than 1.02 volts, and if false branches to step 144. If the open circuit battery voltage is about 1.4 volts or more, step 144 branches to step 146 where the Alk flag is set. Rechargeable batteries cannot be charged to a voltage of 1.4 volts while non-rechargeable batteries when new have voltages greater than 1.4 volts. If the open circuit battery voltage VOC is found in step 144 to be less than 1.4 volts, step 148 then determines if VOC is greater than 1.12 volts. In the range of charged battery states from about 1.12 volts to about 1.4 volts, the internal resistance of a rechargeable battery is generally less than about 0.01 ohms while the internal resistance of a non-rechargeable battery is greater than about 0.1 ohms. When step 148 is true, step 150 determines if VOC−VOC is greater than about 0.015 volts and, if true, branches to the step 146 to indicate that the battery is non-rechargeable or, if false, branches to step 152 where the NiMH flag is set to indicate that the battery is rechargeable. If step 148 is false, then the charged state of the battery is between about 1.02 volts and 1.12 volts in which range the internal resistance of the rechargeable batteries is about the same as the internal resistance of non-rechargeable batteries so that measurements indicative of battery internal resistance are not a reliable indication of whether the battery is rechargeable or non-rechargeable. In this case, step 154 sets the indeterminate flag IND. When the charged state of the battery is in a lower state less that 1.02 volts, then step 142 is false and the procedure branches to step 156 where the closed circuit voltage VCC is divided by the open circuit voltage VOC. When the quotient is less than about 0.15 then the battery is rechargeable and step 158 sets the NiMH flag but when the quotient is 0.15 or greater than the battery is non-rechargeable and step 160 sets the Alk flag. From the steps 134, 136, 146, 152, 154, 158 and 160 the determine battery type procedure returns to step 90 of FIG. 4.

It is noted that the closed circuit voltage VCC across the battery 24 depends upon the value of the load resistance 46 placed by the discharge circuit 42 across the battery. The above determinations in steps 150 and 156 are based upon a load resistance of about 5 ohms. Other values of load resistances would produce different values of VOC−VCC and VCC/NOC which would be used to distinguish rechargeable batteries from non-rechargeable batteries. The comparison values are selected to be midway between ranges of measured values for corresponding rechargeable and non-rechargeable batteries but these comparison values could be any value in the ranges between measured ranges of values for the corresponding rechargeable and non-rechargeable batteries. Additionally calculations other than VOC−VCC and VCC/VOC can be readily used as indications of battery internal resistance to distinguish rechargeable batteries from non-rechargeable batteries. For example the actual value of the internal battery resistance $R_I$ could be calculated by the formula:

$$R_I = \frac{R_L(VOC - VCC)}{VCC}$$

where $R_L$ is the load resistance. Then this calculated internal battery resistance could be compared with a value between measured ranges of internal resistance for the corresponding rechargeable and non-rechargeable batteries. Many other calculations indicative of internal battery resistances could be used.

The battery discharge circuit 42 is illustrated with only one resistance value to be connected across the battery. However, the circuit 42 could include two or more resistances which could be selected individually, in parallel or in series to provide different resistances. For example the resistance used to discharge the battery to a lower charge state could be different from the resistance used to load the battery during measurement of closed circuit voltages. Also different load resistances for different charge states could be used to enhance the ability to distinguish between rechargeable and non-rechargeable batteries.

The illustrated handheld device is a microphone but could be any other handheld device that uses rechargeable batteries.

Additionally the device is shown as containing a single battery with only one cell. However a handheld device can be powered by a plurality of batteries or a battery containing multiple cells. For example the device can employ two, three or more batteries in series or in parallel or the device could employ a nine-volt battery that contains six cells. In the case of employment of a plurality of batteries or a battery with multiple cells, the open-circuit voltages, the closed-circuit voltages, the load resistance values and/or the internal battery resistance values would be correspondingly changed and the comparison values used by the software to determine battery type would also be changed.

Since the above described embodiments are subject to many modifications, variations and changes in detail, it is intended that the above description be interpreted as only illustrative and not in a limiting sense.

The invention claimed is:

1. A battery recharging circuit in a wireless microphone comprising:
   a pair of terminals on the microphone for connecting to an external power supply;
   a battery charging circuit in the microphone connected to the pair of terminals for charging a battery in the microphone;
   a microcontroller in the microphone for controlling the battery charging circuit;
   means for measuring unloaded and loaded voltages across the battery;
   said microcontroller including battery type determining means for determining from the measured voltages whether the battery is a rechargeable or non-rechargeable battery, and means for preventing recharging the battery if the battery is not determined to be a rechargeable type of battery; and
   a discharge circuit operated by the microcontroller for discharging the battery;
   said microcontroller including means responsive to a finding of a battery in an indeterminate charged state wherein unloaded and loaded voltage measurements cannot be reliably used to distinguish rechargeable and non-rechargeable batteries to operate said discharge circuit for discharging the battery to a lower charged state where unloaded and loaded voltage measurements can be reliably used to distinguish rechargeable and non-rechargeable batteries.

2. A battery recharging circuit as claimed in claim 1 wherein the means for measuring unloaded and loaded voltages includes a resistance and a switch controlled by the microcontroller to connect the resistance across the battery during load voltage measurement and for disconnecting the resistance across the battery during unloaded voltage measurement.

3. A battery recharging circuit as claimed in claim 1 wherein the indeterminate charged state is an open circuit battery voltage in the range from about 1.02 volts to about 1.12 volts and the lower charged state is an open circuit battery voltage below about 1.02 volts.

4. A battery recharging circuit as claimed in claim 3 wherein the battery type determining means is responsive to a charged battery state having an open circuit voltage in the range from 1.12 to 1.4 volts to calculate a difference between the loaded and unloaded voltages and to compare the calculated difference to a predetermined value in a range between ranges of predetermined values calculated from measured voltages on known types of rechargeable and non-rechargeable batteries.

5. A battery recharging circuit as claimed in claim 3 wherein the battery type determining means is responsive to the lower charged state to calculate a quotient from the measured unloaded and loaded voltages and to compare the calculated quotient with a predetermined quotient value in a range between ranges of predetermined quotient values calculated from measured voltages on known types of rechargeable and non-rechargeable batteries.

6. A battery recharging circuit as claimed in claim 1 wherein the battery type determining means calculates a value dependent upon battery internal resistance from the measured voltages, and compares the calculated value with a predetermined value in a range between ranges of predetermined values calculated from measured voltages on known types of rechargeable and non-rechargeable batteries.

7. A battery recharging circuit as claimed in claim 1 wherein the battery type determining means is responsive to a charged battery state having an open circuit voltage in the range from 1.12 to 1.4 volts to calculate a difference between the loaded and unloaded voltages and to compare the calculated difference to a predetermined value in a range between ranges of predetermined values calculated from measured voltages on known types of rechargeable and non-rechargeable batteries.

8. A battery recharging circuit for recharging a standard size battery or batteries in a portable handheld device comprising:
   a pair of tenninals on the handheld device for connecting the handheld device to an external power supply;
   a battery charging circuit in the handheld device connected to the pair of terminals for charging a battery in the handheld device;
   a microcontroller in the handheld device for controlling the battery charging circuit;
means for measuring unloaded and loaded voltages across the battery; and
   a discharge circuit operated by the microcontroller for discharging the battery;
   said microcontroller including battery type determining means for determining from the measured voltages whether the battery is a rechargeable or non-rechargeable battery, means responsive to a finding of a battery in an indeterminate charged state wherein unloaded and loaded voltage measurements cannot be reliably used to distinguish rechargeable and non-rechargeable batteries to operate said discharge circuit for discharging the battery to a lower charged state where unloaded and loaded voltage measurements can be reliably used to distinguish rechargeable and non-rechargeable batteries, and means for preventing recharging the battery if the battery is not determined to be a rechargeable type of battery.

9. A battery recharging circuit as claimed in claim 8 wherein the discharge circuit includes a resistance and a switch controlled by the microcontroller to connect the resistance across the battery during discharge of the battery.

10. A battery recharging circuit as claimed in claim 8 wherein the discharge circuit and the measuring means include a common resistance and a switch controlled by the microcomputer to connect the resistance across the battery during discharge of the battery and during loaded voltage measurement and for disconnecting the resistance across the battery during unloaded voltage measurement.

11. A battery recharging circuit as claimed in claim 8 wherein the indeterminate charged state is an open circuit battery voltage in the range from about 1.02 volts to about 1.12 volts and the lower charged state is an open circuit battery voltage below about 1.02 volts.

12. A battery recharging circuit as clalmed in claim 11 wherein the battery type determining means is responsive to a charged battery state having an open circuit voltage in the range from 1.12 to 1.4 volts to calculate a difference between the loaded and unloaded voltages and to compare the calculated difference to a predetermined value in a range between ranges of predetermined values calculated from measured voltages on known types of rechargeable and non-rechargeable batteries.

13. A battery recharging circuit as claimed in claim 11 wherein the battery type determining means is responsive to the lower charged state to calculate a quotient from the measured unloaded and loaded voltages and to compare the calculated quotient with a predetermined quotient value in a range between ranges of predetermined quotient values calculated from measured voltages on known types of rechargeable and non-rechargeable batteries.

14. A battery recharging circuit as claimed in claim 8 wherein the battery type determining means calculates a value dependent upon battery internal resistance from the measured voltages, and compares the calculated value with a predetermined value in a range between ranges of predetermined values calculated from measured voltages on known types of rechargeable and non-rechargeable batteries.

15. A battery recharging circuit as claimed in claim 8 wherein the battery type determining means is responsive to a charged battery state having an open circuit voltage in the range from 1.12 to 1.4 volts to calculate a difference between the loaded and unloaded voltages and to compare the calculated difference to a predetermined value in a range between ranges of predetermined values calculated from measured voltages on known types of rechargeable and non-rechargeable batteries.

16. A wireless microphone having a battery recharging circuit comprising:
a microphone having microphone circuitry and a pair of terminals on the microphone for connecting to an external power supply;
a battery charging circuit in the microphone connected to the pair of terminals for charging a battery in the microphone;
a microcontroller in the microphone for controlling the battery charging circuit;
means for measuring unloaded and loaded voltages across the battery;
said microcontroller including battery type determining means for determining from the measured voltages whether the battery is a rechargeable or non-rechargeable battery,
means for preventing recharging the battery if the battery is not determined to be a rechargeable type of battery; and
a discharge circuit overated by the microcontroller for discharging the battery;
said microcontroller including means responsive to a finding of a battery in an indeterminate charged state wherein unloaded and loaded voltage measurements cannot be reliably used to distinguish rechargeable and non-rechargeable batteries to operate said discharge circuit for discharging the battery to a lower charged state where unloaded and loaded voltage measurements can be reliably used to distinguish rechargeable and non-rechargeable batteries.

17. A wireless microphone as claimed in claim 16 wherein the means for measuring unloaded and loaded voltages includes a resistance and a switch controlled by the microcontroller to connect the resistance across the battery during load voltage measurement and for disconnecting the resistance across the battery during unloaded voltage measurement.

18. A wireless microphone as claimed in claim 16 wherein the discharge circuit includes a resistance and a switch controlled by the microcontroller for connecting the resistance across the battery during discharge of the battery and also during load voltage measurement and for disconnecting the resistance across the battery during unloaded voltage measurement.

19. A battery recharging circuit in a portable handiheld device comprising:
a pair of terminals on the device for connecting to an external power supply;
a battery charging circuit in the device connected to the pair of terminals for charging a battery in the device;
a microcontroller in the microphone for controlling the battery charging circuit;
means for measuring unloaded and loaded voltages across the battery;
said microcontroller including battery type determining means for determining from the measured voltages whether the battery is a rechargeable or non-rechargeable battery, and means for preventing recharging the battery if the battery is not determined to be a rechargeable type of battery; and
said microcontroller including means responsive to a finding of a battery in an indeterminate charged state wherein unloaded and loaded voltage measurements cannot be reliably used to distinguish rechargeable and non-rechargeable batteries for preventing recharging of the battery until the battery is discharged to a lower charged state where unloaded and loaded voltage measurements can be reliably used to distinguish rechargeable and non-rechargeable batteries.

20. A battery recharging circuit as claimed in claim 19 wherein the indeterminate charged state is an open circuit battery voltage in the range from about 1.02 volts to about 1.12 volts and the lower charged state is an open circuit battery voltage below about 1.02 volts.

* * * * *